United States Patent [19]

Logan, Jr.

[11] 3,914,591

[45] Oct. 21, 1975

[54] ANALOG ELECTRONIC MULTIPLIER

[75] Inventor: Benjamin Franklin Logan, Jr., Madison, N.J.

[73] Assignee: Bell Telephone Laboratories, Incorporated, Murray Hill, N.J.

[22] Filed: Apr. 19, 1974

[21] Appl. No.: 462,293

[52] U.S. Cl. ............... 235/194; 235/183; 325/38 B; 332/11 D

[51] Int. Cl.² ............................................ G06G 7/16

[58] Field of Search ........... 235/194, 195, 196, 181, 235/183; 332/11 D; 325/38 B; 307/229; 328/160, 161

[56] References Cited

UNITED STATES PATENTS

| | | | |
|---|---|---|---|
| 3,479,495 | 11/1969 | Malm | 235/194 X |
| 3,496,468 | 2/1970 | Kaneko et al. | 332/11 D X |
| 3,652,957 | 3/1972 | Goodman | 332/11 D |
| 3,701,017 | 10/1972 | Laane | 325/38 B |

*Primary Examiner*—Joseph F. Ruggiero
*Attorney, Agent, or Firm*—G. E. Murphy; H. L. Logan

[57] ABSTRACT

A multiplier circuit is disclosed herein, comprising two asynchronous delta modulators which transform applied analog input signals into multilevel signals. The input signals are modified by the analog multiplication of each analog input signal with the multilevel signal derived from the other analog input signal, and the modified signals are properly added and integrated to form a signal which represents the desired product to an arbitrarily close degree of approximation.

9 Claims, 5 Drawing Figures

ANALOG ELECTRONIC MULTIPLIER

BACKGROUND OF THE INVENTION

This invention relates to computing apparatus. More specifically, this invention relates to analog computing apparatus capable of forming a product of two applied analog input signals.

One approach to signal multiplication is disclosed, for example, by H. A. Wittlinger in U.S. Pat. No. 3,621,226, issued Nov. 16, 1971, wherein the nonlinear characteristics of diodes and transistors are utilized. Designs based on such nonlinearities require careful control of the nonlinear characteristics utilized, and invariably, such nonlinearities impose limitations on the useful temperature range, signal dynamic range, and the frequency response of the apparatus.

Another approach to signal multiplication is disclosed, for example, by D. C. Kalbfell in U.S. Pat. No. 3,017,108, issued Jan. 16, 1962, wherein pulse-height-/pulse-width modulation is utilized to achieve the multiplication of input signals. Due to stringent linearity requirements and switching limitations, however, these circuits generate output signal errors which cannot be practically diminished and which, therefore, limit the useful operation of the circuits.

Still another approach to analog signal multiplication is disclosed by S. Darlington in U.S. Pat. No. 2,473,414, issued June 14, 1949. The Darlington multiplier, which hereinafter is more fully described, utilizes a multiplication approach with is superficially similar to that of this invention, but it, too, generates an output signal error which cannot be practically diminished and which, therefore, reduces the practical utility of the circuit.

A general object of this invention is the provision of a multiplication calculator circuit which produces an output signal having an amplitude that is instantaneously proportional to a product of the amplitudes of two analog input signals.

Another object of this invention is the realization of a calculator circuit which accommodates both positive and negative input signals and which produces an output signal of the proper algebraic sign.

A further object of this invention is a calculator circuit which develops a product output signal with an arbitrarily small error signal.

SUMMARY OF THE INVENTION

These and other objects of the invention are achieved by a circuit which includes two asynchronous delta modulators, each responsive to an input signal. Each delta modulator generates a digital signal whose integral closely approximates the modulator's input signal. The calculator circuit further includes two elementary analog multipliers, each of which multiplies the integral of the digital signal of each delta modulator with the digital signal of the other modulator. The output signals of the elementary multipliers are then added and integrated to form the desired product signal.

BRIEF DESCRIPTION OF THE DRAWING

The various features and advantages of the present invention will be more readily apparent to those skilled in the art from the appended detailed description taken in conjunction with the drawings in which.

DETAILED DESCRIPTION

Figure 1:
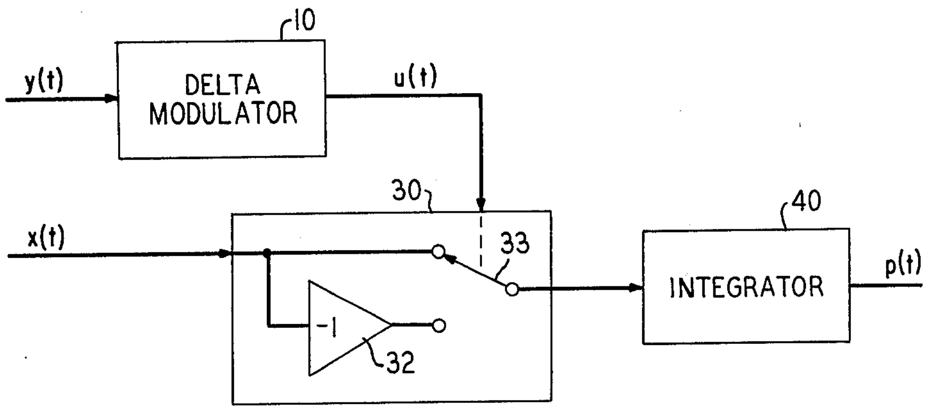
FIG. 1 PRIOR ART
FIG. 1 is a schematic diagram of a prior art analog multiplier circuit.

FIG. 1 is a schematic diagram depicting the analog multiplier circuit disclosed by S. Darlington in the above-mentioned patent. It comprises what essentially is an asynchronous delta modulator 10, of the type shown in FIG. 2, responsive to an analog input signal, $y(t)$, which develops a digital, two-state, control signal, $u(t)$, (alternating between +U and −U) whose time integral closely approximates the input signal, $y(t)$. The Darlington multiplier further comprises a switch assembly 30, responsive to an input signal, $x(t)$, and to the control signal, $u(t)$. Switch assembly 30 includes an inverting amplifier 32 and a single pole double-throw switch 33. Switch assembly 30 is controlled by $u(t)$ so that when $ut)$ is at the +U state, the output signal of switch assembly 30 corresponds to the input signal, $x(t)$, but when $u(t)$ is at the −U state, the output signal of switch assembly 30 corresponds to $-x(t)$. To obtain the desired product signal, $p(t)$, the Darlington multiplier includes an integrator network 40 which integrates the output signal of switch assembly 30.

In order to assist in an understanding and appreciation of the instant invention, a mathematical analysis of the Darlington multiplier of FIG. 1 is necessary. To that end, the delta modulator of FIG. 1 is shown in greater detail in FIG. 2. It comprises a threshold device 17, responsive to an error signal $e(t)$, whose output signal, $u(t)$, assumes either one of the two states +U and −U. This output signal is integrated in network R1-C1 to develop an approximation signal $\hat{y}(t)$ which is subtracted from the input signal $y(t)$ in element 16. The difference signal $y(t)-\hat{y}(t)$, constitutes the approximation error signal $e(t)$. Input signal $y(t)$ can assume both positive and negative values. Expressed mathematically, it can be shown that the approximation signal $y(t)$ can be expressed by the convolution equation $$\hat{y}(t) = y(t) - e(t) = \int_{-\infty}^{\infty} u(\xi)\, h(t-\xi)\, d\xi \qquad (1)$$

where $h(t)$ is the impulse response of the integrator network R1-C1 and equals $(l/\tau)$ $(\exp(-t/\tau)$ ), and the time constant, $\tau$, equals the product R1.Cl. It can further be shown that $e(t)$ can be made arbitrarily small. From the above, it can still further be shown, with the aid of integral calculus, that $$u(t) = \hat{y}(t) + \frac{d\hat{y}(t)}{dt}. \qquad (2)$$

In applying the above mathematical analysis of the delta modulator to the multiplier of FIG. 1, it is clear that since $u(t)$ controls the switch assembly 30 by allowing either $+x(t)$ or $-x(t)$ to reach integrator 40, the operation of the switch assembly 30 may be expressed as a multiplication of $x(t)$ by l/U $\cdot$ $u(t)$. Consequently, the output signal of integrator 40 in FIG. 1 is $$p(t) = \frac{1}{U}\int_{-\infty}^{\infty} x(\xi)\, u(\epsilon)\, h'(t-\epsilon)\, d\epsilon \qquad (3)$$

where $h'(t)$ is the impulse response of integrator 40.

By rewriting $x(\xi)$ as $\{x(t) + [x(\xi) - x(t)]\}$, setting $h'(t)$ equal to $h(t)$, and by changing the variable of integration in equation (3), it can be shown that $$p(t) = \frac{1}{U}[x(t)y(t) + e(t)x(t) + \delta(t)] \qquad (4)$$

where the dynamic error term, $\delta(t)$ equals $$\int_{-\infty}^{\infty} h(\xi)\,[x(t-\xi) - x(t)]u(t-\xi)\,d\xi \qquad (5)$$

Although the error term $e(t)x(t)$ can be made arbitrarily small since the error term $e(t)$ can be made arbitrarily small, the dynamic error term $\delta(t)$ cannot, in practice, be made arbitrarily small. The term $\delta(t)$ is dependent upon the dynamic range of the $x(t)$ signal, upon the bandwidth of the $x(t)$ signal, and upon the impulse response $h(t)$. Thus, for an $x(t)$ signal having a fixed dynamic range and bandwidth, the dynamic error can be made arbitrarily small only by making the effective averaging time of the impulse response sufficiently small. However, in practice, a reduction in the time response of $h(t)$ requires an increase in the switching rate of $u(t)$ in the modulator to maintain the error term $e(t)$ below a predetermined threshold level. It is well known that ideal switching waveforms are not possible to achieve. Consequently, practical switching waveforms introduce errors, and the effects of these errors increase as the rate of switching increases. Therefore, an increase in the switching rate of $u(t)$ does not, in practice, reduce the dynamic error.

Figure 2:
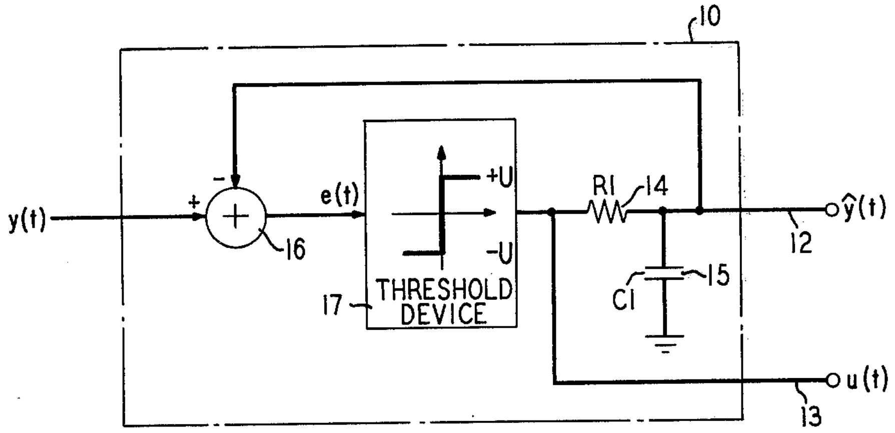
FIG. 2 illustrates in greater detail the asynchronous delta modulator of FIG. 1.
Figure 3:
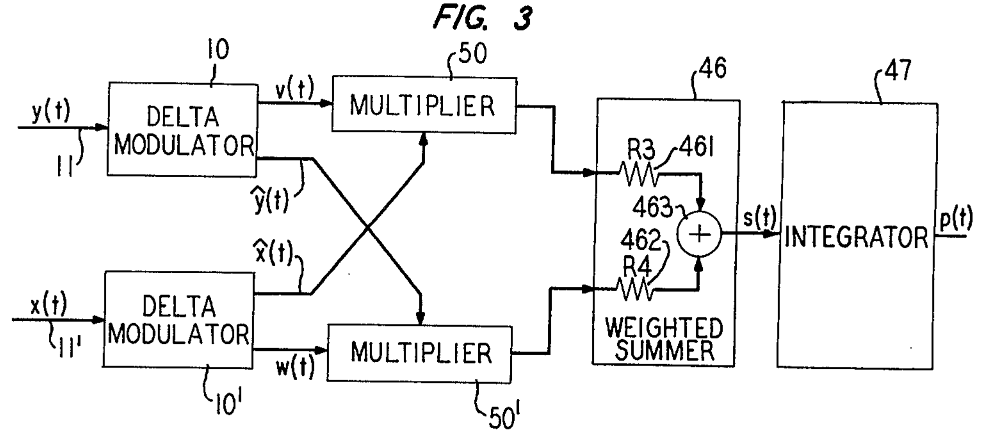
FIGS. 3 and 4 are schematic diagrams of two implementations of the multiplication calculator circuit of this invention.

The multiplication calculator circuit of this invention, one embodiment of which is depicted in FIG. 3, eliminates the dynamic error problem associated with the Darlington multiplier. It comprises a delta modulator 10 of the type shown in FIG. 2, responsive to input signal $y(t)$, and a delta modulator 10' of the type shown in FIG. 2, responsive to input signal $x(t)$; an elementary multiplier 50, responsive to the input approximation signal, $\hat{x}(t)$, of modulator 10' and to the multilevel signal, $v(t)$, of modulator 10; and an elementary multiplier 50', responsive to the input approximation signal, $\hat{y}(t)$, of modulator 10 and to the multilevel signal, $w(t)$, of modulator 10'. Elementary multipliers 50 and 50' are conventional multipliers capable of multiplying one analog signal with a second multilevel analog signal. This is equivalent to multiplying an analog signal with a selected one of a plurality of constants. Such elementary multiplication, as is well known, can be achieved by the switching of attenuation resistors followed by proper amplification. The multiplication calculator circuit of FIG. 3 further includes a conventional analog weighted summer 46, comprising resistors 461 462 and a summer 463, responsive to the output signals of multipliers 50 and 50', and an integrator 47, of the type used, for example, in modulator 10, responsive to the output signal of weighted summer 46. Integrator 47 develops the desired multiplier product signal, $p(t)$.

For ease of analysis and for quicker appreciation of this invention, the asynchronous delta modulators of FIG. 3 (elements 10 and 10'), are considered to be single bit delta modulators of the type used in the Darlington multiplier of FIG. 1, providing a multilevel signal having values +U and −U. Accordingly, the elementary multipliers 50 and 50' need only be capable of multiplying by a constant or its algebraic negative.

Expressed mathematically, the output signals of multipliers 50' and 50 are $\hat{y}(t)w(t)$, and $\hat{x}(t)v(t)$, respectively, and the output signal of summer 46, $s(t)$, is $$s(t) = K_1\hat{y}(t)w(t) + K_2\hat{x}(t)v(t) \qquad (6)$$

where $K_1$ and $K_2$ are the weighting function of the weighted summer 46, as realized in FIG. 3, for example, by resistors R3 and R4, respectively. Utilizing the equality of equation (2), the above can be rewritten as $$s(t) = K_1\hat{y}(t)\left[\hat{x}(t) + \tau_1\frac{d\hat{x}(t)}{dt}\right] + K_2\hat{x}(t)\left[\hat{y}(t) + \tau_2\frac{d\hat{y}(t)}{dt}\right] \qquad (7)$$

where $\tau_1$ is the time constant of the integrator network in modulator 10', and where $\tau_2$ is the time constant of the integrator in modulator 10. If $K_1$ is arbitrarily made to equal $$\frac{\tau_2}{\tau_1 + \tau_2}$$

and $K_2$ is arbitrarily made to equal $$\frac{\tau_1}{\tau_1 + \tau_2},$$

equation (7) can be written as $$s(t) = \hat{x}(t)\hat{y}(t) + \frac{\tau_1\tau_2}{\tau_1 + \tau_2}\frac{d[\hat{x}(t)\hat{y}(t)]}{dt} \qquad (8)$$

which is of identical form as that of equation (2).

Equation (2) defines the multilevel signal of the delta modulator of FIG. 2 and, in conjunction with FIG. 2 and with equation (1), teaches that integration of signal $u(t)$ with a time constant $\tau$ yields the signal $\hat{y}(t)$, which can be made to approximate an applied $y(t)$ to an arbitrarily close degree of approximation. With parallel reasoning, equation (8) teaches that integration of signal $s(t)$ with a time constant $$\frac{\tau_1\tau_2}{\tau_1 + \tau_2}$$

yields the signal $\hat{x}(t)\hat{y}(t)$; and since by equation (1)

$$\hat{x}(t) = x(t) - e_x(t) \text{ and } \hat{y}(t) = y(t) - e_y(t), \qquad (9)$$

where $e_x(t)$ and $e_y(t)$ are independent and arbitrarily small, it follows that the $\hat{x}(t)\hat{y}(t)$ signal closely corresponds to the desired product signal $x(t)y(t)$. Thus, the apparatus of this invention generates a signal representative of the product of two incoming signals, having both positive and negative values, with no error other than a residual error which can be made arbitrarily small.

Figure 4:
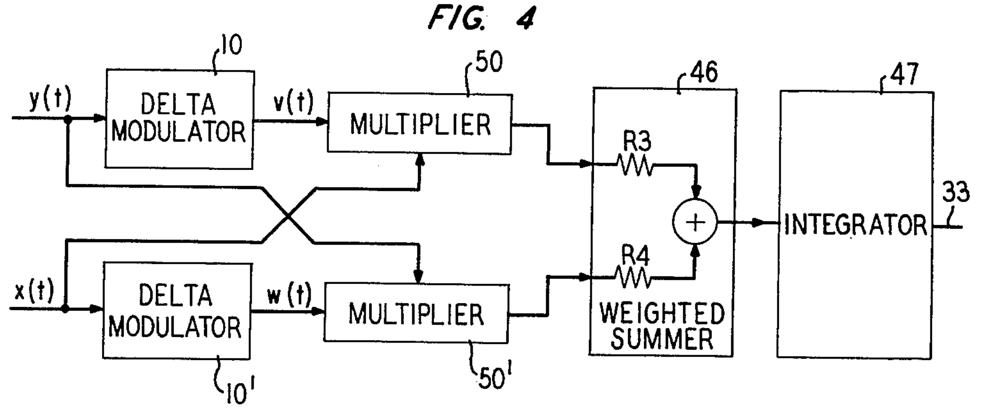

It should be noted that the embodiment shown in FIG. 3 is only illustrative of the principles of this invention and that various modifications are possible which are within the spirit and scope of this invention. For example, FIG. 4 depicts a multiplication calculator circuit which comprises the same identically labeled elements included in the multiplier of FIG. 3 and which co-act in exactly the same manner as in the multiplier of FIG. 3, with the exception that multipliers 50 and 50' are connected to input signals $x(t)$ and $y(t)$ instead of to signals $\hat{x}(t)$ and $\hat{y}(t)$, respectively. This change in interconnection corresponds to a modification in equation (7), above, to a weighted summer signal, $s(t)$, equal to $$s(t) = K_1\,[\hat{y}(t) + e_y(t)]\left[\hat{x}(t) + \tau_1\,\frac{d\hat{x}(t)}{dt}\right] + K_2\,[\hat{x}(t) + e_x(t)]\left[\hat{y}(t) + \tau_2\,\frac{d\hat{y}(t)}{dt}\right] \quad (10)$$

which contains the expression of equation (8) plus an additional term multiplied by either $e_x(t)$ or $e_y(t)$. However, since $e_y(t)$ and $e_x(t)$ can be made arbitrarily small, equation (10) approximates equation (8). Therefore, the output signal of the multiplier of FIG. 4 approximates the output signal of the multiplier of FIG. 3 and the desired product $x(t)y(t)$ to an arbitrarily close degree of approximation.

Figure 5:
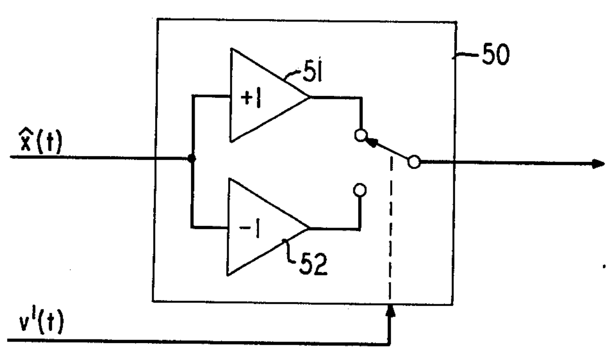
FIG. 5 depicts one implementation of the elementary multiplier elements of FIGS. 3 and 4.

Additional variations may also be implemented within the multiplication calculator circuit of FIG. 3. For example, multiplication $v(t)$ is akin to multiplication by $v'(t)$ alternating between +1 and −1, followed by a gain factor, V. Viewed in this light, elementary multiplier 50 (and 50') can be replaced by a multiplexing switch controlled by $v'(t)$ which applies either $\hat{x}(t)$ or $-\hat{x}(t)$ to the weighted summer 46. Such an elementary multiplier may be implemented, for example, as shown in FIG. 5, by utilizing a unity gain amplifier 51 and a unity gain inverting amplifier 52, both interposed between the input signal of elementary multiplier 50 and a single pole, double-throw multiplexing switch, responsive to control signal $v'(t)$, which connects the multiplexed signal to summer 46. In this configuration, the gain factor V may be included in the weighting factors of weighted summer 46.

What is claimed is:

1. An analog multiplier comprising:

a first asynchronous delta modulator responsive to a first analog signal;

a second asynchronous delta modulator responsive to a second analog signal;

first switching means, controlled by the output signal of said second modulator, responsive to said first analog signal and its algebraic negative for commutating between said first analog signal and its negative;

second switching means, controlled by the output signal of said first modulator, responsive to said second analog signal and its algebraic negative for commutating between said second analog signal and its negative;

means for algebraically combining the output signals of said first and second switching means; and integration means responsive to said means for combining for developing a signal representative of the product of said first analog signal and said second analog signal.

2. Apparatus for developing a signal representative of the product of a first analog input signal and a second analog input signal comprising:

a first asynchronous delta modulator responsive to said first input signal for developing a first multilevel signal and a first integral signal corresponding to the integral of said first multilevel signal;

a second asynchronous delta modulator responsive to said second input signal for developing a second multilevel signal and a second integral signal corresponding to the integral of said second multilevel signal;

first means for multiplying said first integral signal with said second multilevel signal;

second means for multiplying said second integral signal with said first multilevel signal;

third means for algebraically combining said multiplied signal; and means for integrating the output signal of said third means to develop an output signal representative of said product of said first and second input signals.

3. The apparatus defined in claim 2 wherein said delta modulators are one-bit nonadaptive delta modulators.

4. The apparatus defined in claim 3 wherein each of said means for multiplying comprises:

means for generating a signal corresponding to the algebraic negative of an applied integral signal, and means for switching between said integral signal and its said negative under control of an applied multilevel signal.

5. Apparatus for developing signal representative of the product of a first input signal and a second input signal comprising:

a first modulator responsive to said first input signal for developing a first multilevel signal;

a second modulator responsive to said second input signal for developing a second multilevel signal;

first means for multiplying said first multilevel signal with said second input signal;

second means for multiplying said second multilevel signal with said first input signal; and means for jointly integrating the output signals of said first and second means.

6. Apparatus for developing a signal representative of the product of a first input signal and a second input signal comprising:

first means responsive to said first input signal for developing a first binary signal representative of said first input signal and including integration means having a time constant $\tau_1$ for developing an integral signal of said first binary signal;

second means responsive to said second input signal for developing a second binary signal representative of said second input signal and including integration means having a time constant $\tau_2$ for developing an integral signal of said second binary signal;

third means for multiplying said first binary signal with said integral signal of said second binary signal;

fourth means for multiplying said second binary signal with said integral signal of said first binary signal;

means for adding the output signal of said third means, modified by a weighting factor $$\frac{\tau_1}{\tau_1 + \tau_2},$$

to the output signal of said fourth means, modified by a weighting factor $$\frac{\tau_2}{\tau_1 + \tau_2};$$

and means for integrating the output signal of said means for adding, with an integrating time constant $$\frac{\tau_1\tau_2}{\tau_1 + \tau_2},$$

to form the desired product signal.

7. Apparatus for developing a signal representative of the product of a first input signal and a second input signal comprising:

a first delta modulator responsive to said first input signal for developing a first multilevel signal and an integral signal of said first multilevel signal that is an analog approximation of said first input signal, which integral signal is developed by a convolution process with an exponential function having a first time constant;

a second delta modulator responsive to said second input signal for developing a second multilevel signal and an integral signal of said second multilevel signal that is an analog approximation of said second input signal, which integral signal is developed by a convolution process with an exponential function having a second time constant;

first means for multiplying said first multilevel signal with said integral signal of said second multilevel signal;

second means for multiplying said second multilevel signal with said integral signal of said first multilevel signal; and third means for jointly integrating the output signals of said first and second means for multiplying, which integral signal is developed by a convolution process with an exponential function having a third time constant.

8. The apparatus of claim 7 wherein said third means develops its output signal by a convolution of a weighted sum of the output signals of said first and second means with an exponential function having a time constant that is related to said first and said second time constants.

9. The apparatus of claim 8 wherein said weighted sum is related to said first and second time constants.

* * * * *